US008085831B2

(12) United States Patent
Teague (10) Patent No.: US 8,085,831 B2
(45) Date of Patent: Dec. 27, 2011

(54) INTERFERENCE CONTROL VIA SELECTIVE BLANKING/ATTENUATION OF INTERFERING TRANSMISSIONS

(75) Inventor: Edward Harrison Teague, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 850 days.

(21) Appl. No.: 10/848,023

(22) Filed: May 17, 2004

(65) Prior Publication Data

US 2005/0254555 A1    Nov. 17, 2005

(51) Int. Cl.
*H04B 1/00* (2006.01)
(52) U.S. Cl. ........ 375/132; 375/130; 375/135; 375/136; 375/259
(58) Field of Classification Search ................... 375/136, 375/132, 130, 133, 135, 259
See application file for complete search history.

(56) References Cited

U.S. PATENT DOCUMENTS

| 5,570,352 | A | * | 10/1996 | Poyhonen | 370/330 |
| 5,867,478 | A | | 2/1999 | Baum et al. | |
| 6,473,418 | B1 | * | 10/2002 | Laroia et al. | 370/344 |
| 6,480,055 | B2 | | 11/2002 | Bohm et al. | |
| 6,490,262 | B1 | * | 12/2002 | Hogger | 370/337 |
| 6,493,331 | B1 | * | 12/2002 | Walton et al. | 370/341 |
| 6,519,326 | B1 | * | 2/2003 | Haartsen et al. | 370/332 |
| 6,587,510 | B1 | * | 7/2003 | Minami et al. | 375/285 |
| 6,751,444 | B1 | * | 6/2004 | Meiyappan | 455/69 |
| 6,775,558 | B1 | * | 8/2004 | Ranta et al. | 455/557 |
| 6,788,963 | B2 | * | 9/2004 | Laroia et al. | 455/574 |
| 6,961,595 | B2 | * | 11/2005 | Laroia et al. | 455/574 |
| 6,985,498 | B2 | * | 1/2006 | Laroia et al. | 370/478 |
| 6,987,955 | B1 | * | 1/2006 | Sapozhnykov et al. | 455/127.5 |
| 7,016,319 | B2 | * | 3/2006 | Baum et al. | 370/329 |
| 7,068,977 | B1 | | 6/2006 | Yang et al. | |
| 7,148,749 | B2 | * | 12/2006 | Rahman et al. | 330/279 |

(Continued)

FOREIGN PATENT DOCUMENTS

CL            280-1997           9/1997

(Continued)

OTHER PUBLICATIONS

Chung-Keun Lee Jinsoo Kim Seung-Woo Seo, Generation and performance analysis of frequency-hopping opticalorthogonal codes with arbitrary time blank patterns, Jun. 11, 2001-Jun. 14, 2001, Communications, 2001. ICC 2001. IEEE International Conference on, vol. 4, On pp. 1275-1279 vol. 4.*

(Continued)

*Primary Examiner* — Kenneth Lam
(74) *Attorney, Agent, or Firm* — Sandip S. Minhas; Mary A. Fales (57) ABSTRACT

Inter-sector interference for a target user in a sector may be controlled by selectively blanking or attenuating transmit powers for interfering users in neighboring sectors whenever their transmissions collide. The sector provides the frequency hopping (FH) sequence or subband usage for the target user to the neighboring sectors. Each neighboring sector uses the target user's FH sequence to form a blanking pattern. Each neighboring sector then either blanks or reduces transmit power for each subband in its blanking pattern. Each user in each neighboring sector receives either (1) punctured symbols for subbands in the blanking pattern, if blanking is performed, or (2) lower energy symbols for these subbands, if attenuation is performed. In any case, the target user and each neighboring user may process their received symbols in the normal manner and do not need to be informed of the blanking/attenuation.

35 Claims, 7 Drawing Sheets

U.S. PATENT DOCUMENTS

| | | | |
|---|---|---|---|
| 7,151,755 B2 * | 12/2006 | Xu | 370/330 |
| 7,421,005 B2 * | 9/2008 | Craig et al. | 375/132 |
| 2002/0021746 A1 | 2/2002 | Schmidl et al. | 375/132 |
| 2002/0085641 A1 * | 7/2002 | Baum | 375/260 |
| 2002/0159422 A1 * | 10/2002 | Li et al. | 370/342 |
| 2003/0039218 A1 | 2/2003 | Kwak | 370/320 |
| 2004/0001429 A1 * | 1/2004 | Ma et al. | 370/210 |
| 2004/0127223 A1 * | 7/2004 | Li et al. | 455/446 |
| 2004/0166887 A1 * | 8/2004 | Laroia et al. | 455/522 |
| 2005/0036441 A1 * | 2/2005 | Laroia et al. | 370/203 |
| 2005/0163194 A1 * | 7/2005 | Gore et al. | 375/132 |
| 2005/0204192 A1 * | 9/2005 | Dominique et al. | 714/18 |
| 2005/0265222 A1 * | 12/2005 | Gerlach | 370/208 |

FOREIGN PATENT DOCUMENTS

| | | |
|---|---|---|
| CL | 2949-1998 | 7/1999 |
| CL | 1381-1999 | 11/1999 |
| CL | 1853-2000 | 6/2001 |
| CL | 158-2005 | 10/2005 |
| EP | 1087559 | 3/2001 |
| EP | 1 598 971 A1 | 3/2004 |
| JP | 2000299680 A | 10/2000 |
| JP | 2001358615 | 12/2001 |
| JP | 2002135230 | 5/2002 |
| JP | 20030530009 | 10/2003 |
| JP | 20044274220 | 9/2004 |
| JP | 2004320679 A | 11/2004 |
| JP | 2005006116 | 1/2005 |
| WO | 9966744 | 12/1999 |
| WO | WO02/37733 A2 | 5/2002 |
| WO | WO2004019622 | 3/2004 |
| WO | WO2004088892 | 10/2004 |

OTHER PUBLICATIONS

Cheong Yui Wong Cheng, R.S. Lataief, K.B. Murch, R.D., Multiuser OFDM with adaptive subcarrier, bit, and power allocation, Oct. 1999, Selected Areas in Communications, IEEE Journal on, vol. 17, Issue: 10 On pp. 1747-1758.*

Yener, A. Yates, R.D. Ulukus, S., Interference management for CDMA systems through power control, multiuser detection, and beamforming, Jul. 2001, Communications, IEEE Transactions on vol. 49, Issue: 7 On pp. 1227-1239.*

International Search Report—PCT/US05/012069, International Search Authority—European Patent Office, Jan. 20, 2006.

Garnier, et al., "Performance of an OFDM-SDMA Based System in a Time-Varying Multi-Path Channel," VTC 2001 Fall, IEEE VTS 54th Vehicular Technology Conference, 2001, vol. 3, Oct. 7-11, 2001, pp. 1686-1690.

Kim, et al., "Frequency Hopping Metal Orthogonal Codes with Arbitrary Time-Blank Patterns," Applied Optics, Optical Society of America, Washington, US, vol. 41, No. 20 Jul. 10, 2002, pp. 4070-4077.

Wong, "A New Transmission/Reception Scheme for "Blind" Suppression of Co-Channel Interference in FH-CDMA Peer-to-Peer Mobile Communications," IEEE Military Communications Conference, 2001, MILCOM 2001, Communications for Network-Centric Operations: Creating the Information Force, McLean, VA, Oct. 28-30, 2001, vol. 2, pp. 1229-1232.

Written Opinion—PCT/US05/012069, International Search Authority—European Patent Office, Jan. 20, 2006.

International Preliminary Report on Patentability—PCT/US05/012069, The International Bureau of WIPO—Geneva, Switzerland, Nov. 21, 2006.

Hamaguchi et al., "Characteristics of Orthogonal Slow-FH/16QAM System with an Interference Immunity Decoding Method for Digital Land Mobile Communications", The Journal of the Institute of Electronics, Information and Communication Engineers B-II, Jun. 25, 1995, vol. J78, B-II, No. 6, pp. 445-453.

Hamaguchi et al., "Performance of slow-frequency-Hopping Land Mobile Radio with Transmission Power Control", Proceedings of the 1999 IEICE General Conference, Communication 1, Mar. 8, 1999, p. 432, B-5-81.

Ishii et al., "A Study on Pattern Assignment for Slow Frequency Hopping Land Mobile Radio", Proceedings of the 1998 Communications Society Conference of IEICE 1, Sep. 7, 1998, p. 253, B-5-3.

* cited by examiner

Transmitted Symbols - Without Blanking

Sector 1

| 4 | a | c | d | b | c | c | d | a | b | a | d | b |
|---|---|---|---|---|---|---|---|---|---|---|---|---|
| 3 | d | b | c | a | b | b | c | d | a | d | c | a |
| 2 | c | a | b | d | a | a | b | c | d | c | b | d |
| 1 | b | d | a | c | d | d | a | b | c | b | a | c |

→ Time

Sector 2

| 4 | f | e | g | h | f | e | h | g | e | g | h | f |
|---|---|---|---|---|---|---|---|---|---|---|---|---|
| 3 | e | h | f | g | e | h | g | f | h | f | g | e |
| 2 | h | g | e | f | h | g | f | e | g | e | f | h |
| 1 | g | f | h | e | g | f | e | h | f | h | e | g |

1  2  3  4  5  6  7  8  9 10 11 12 → Time

*FIG. 3A*

Transmitted Symbols - With Blanking

Sector 1
(blank for User e)

| 4 | a | ■ | d | b | c | ■ | d | a | ■ | a | d | b |
|---|---|---|---|---|---|---|---|---|---|---|---|---|
| 3 | ■ | b | c | a | ■ | b | c | d | a | d | c | ■ |
| 2 | c | a | ■ | d | a | a | b | ■ | d | ■ | b | d |
| 1 | b | d | a | ■ | d | d | ■ | b | c | b | ■ | c |

→ Time

Sector 2
(blank for Users a and b)

| 4 | ■ | e | g | ■ | f | e | h | ■ | ■ | h | ■ | ■ |
|---|---|---|---|---|---|---|---|---|---|---|---|---|
| 3 | e | ■ | f | ■ | ■ | ■ | g | f | ■ | f | g | ■ |
| 2 | h | ■ | ■ | f | ■ | ■ | ■ | e | g | e | ■ | h |
| 1 | ■ | f | ■ | e | g | f | ■ | ■ | f | ■ | ■ | g |

1  2  3  4  5  6  7  8  9 10 11 12 → Time

*FIG. 3B*

Received Symbols - With Blanking

Sector 1

| a | a | a | a | a | ■ | a | a | a | ■ |   |   | User a |
| b | b | ■ | b | ■ | b | b | b | ■ | b | b | b | User b |
| c | ■ | c | ■ | c | ■ | ■ | c | ■ | c | ■ | c | c | User c |
| ■ | d | d | d | d | d | d | d | d | d | d | d | User d |

Sector 2

| e | e | ■ | e | ■ | e | ■ | e | ■ |   |   |   | User e |
| ■ | f | f | f | f | f | ■ | f | f | f | ■ |   | User f |
|   |   | g |   | g |   | g |   | g |   | g | g | User g |
| h | ■ |   |   |   | h |   |   |   | h | h |   | User h |

Transmitted Symbols - With Blanking & Overlap Transmission

FIG. 4B

Received Symbols - With Blanking & Overlap Transmission

INTERFERENCE CONTROL VIA SELECTIVE BLANKING/ATTENUATION OF INTERFERING TRANSMISSIONS

BACKGROUND

I. Field

The present invention relates generally to communication, and more specifically to techniques for controlling interference in a wireless communication system.

II. Background

In a frequency hopping (FH) communication system, data is transmitted on different frequency subbands in different time intervals, which may be called "hop periods". These subbands may be provided by orthogonal frequency division multiplexing (OFDM), other multi-carrier modulation techniques, or some other constructs. With frequency hopping, the data transmission hops from subband to subband in a pseudo-random manner. This hopping provides frequency diversity and allows the data transmission to better withstand deleterious path effects such as narrow-band interference, jamming, fading, and so on.

An orthogonal frequency division multiple access (OFDMA) system utilizes OFDM and can support multiple users. For a frequency hopping OFDMA (FH-OFDMA) system, each user may be assigned a specific FH sequence that indicates the specific subband(s) to use for data transmission in each hop period. Multiple data transmissions for multiple users may be sent simultaneously using different FH sequences that are orthogonal to one another, so that only one data transmission uses each subband in each hop period. Using orthogonal FH sequences, the multiple data transmissions do not interfere with one another while enjoying the benefits of frequency diversity.

An FH-OFDMA system typically includes many sectors, where the term "sector" can refer to a base transceiver subsystem (BTS) and/or the coverage area of the BTS, depending on the context in which the term is used. Data transmissions for users communicating with the same sector may be sent using orthogonal FH sequences to avoid "intra-sector" interference, as described above. However, data transmissions for users in different sectors are typically not orthogonalized. Each user thus observes "inter-sector" interference from users in other sectors. The detrimental effects of inter-sector interference may be reduced by defining the FH sequences for each sector to be pseudo-random or independent with respect to the FH sequences for nearby sectors. The use of pseudo-random FH sequences randomizes inter-sector interference so that each user observes the average interference from users in other sectors. However, the randomized inter-sector interference may still significantly degrade performance for some disadvantaged users observing high levels of interference.

There is therefore a need in the art for techniques to reduce inter-sector interference in order to improve performance for disadvantaged users.

SUMMARY

Techniques for controlling inter-sector interference in order to improve performance for disadvantaged (or "target") users observing high interference levels are described herein. These techniques may be used for various wireless communication systems and for the forward link as well as the reverse link.

Inter-sector interference for a target user in a given sector may be controlled by selectively turning off (i.e., blanking) or reducing (i.e., attenuating) transmit powers for interfering users in neighboring sectors whenever these users' transmissions overlap with the target user's transmission. Selective blanking/attenuation may be performed in various manners. For example, the sector may have difficulty communicating with the target user and may inform the neighboring sectors of the difficulty and provide the FH sequence or subband usage for the target user. Each neighboring sector obtains the target user's FH sequence and uses it to form a blanking pattern for that sector. The blanking pattern for each sector contains subbands for which reduced interference from that sector is sought. Each neighboring sector may then either blank or reduce transmit power for each subband in its blanking pattern.

Each user in each neighboring sector (i.e., each neighboring user) receives either no transmission or transmission with reduced power for each subband in the blanking pattern for that sector. If the FH sequences for each sector are pseudo-random with respect to the FH sequences for nearby sectors, then the blanking pattern for each neighboring sector will be uncorrelated with the FH sequences for that sector. If blanking is performed, then each neighboring user would experience randomized puncturing (or deletion) of data symbols that are not transmitted on subbands in the blanking pattern. If attenuation is performed, then each neighboring user would receive lower energy symbols on subbands in the blanking pattern. In any case, the target user and each neighboring user may process their received symbols in the normal manner and do not need to be informed of the selective blanking/attenuation being performed.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
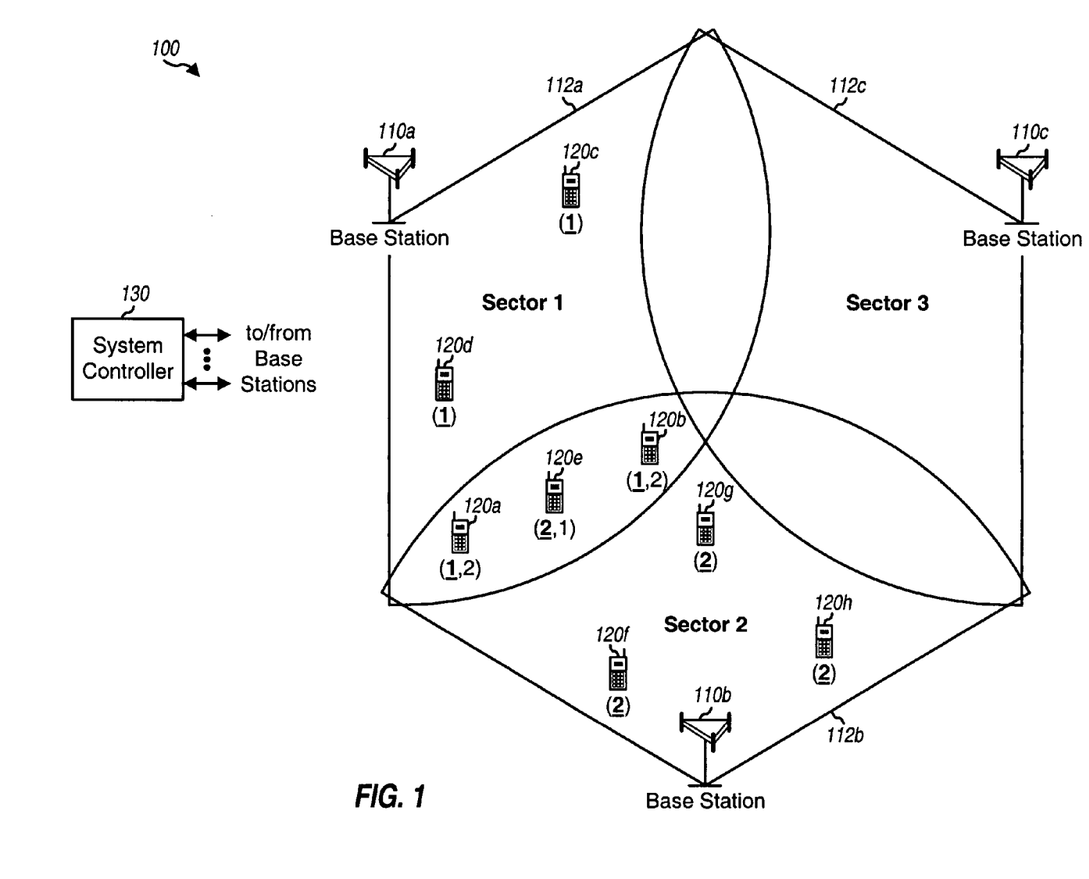
FIG. 1 shows a wireless multiple-access communication system.

FIG. 1 shows a wireless multiple-access communication system 100. System 100 includes a number of base stations 110 that support communication for a number of wireless terminals 120. A base station 110 is a fixed station used for communicating with the terminals 120 and may also be referred to as an access point, a Node B, or some other terminology. Terminals 120 are typically dispersed throughout the system, and each terminal 120 may be fixed or mobile. A terminal 120 may also be referred to as a mobile station, user equipment (UE), a wireless communication device, or some other terminology. Each terminal 120 may communicate with one or possibly multiple base stations 110 on the forward and reverse links at any given moment. The forward link (or downlink) refers to the communication link from the base stations 110 to the terminals 120, and the reverse link (or uplink) refers to the communication link from the terminals to the base stations 110. A system controller 130 couples to base stations 110, provides coordination and control for these base stations 110, and further controls the routing of data for the terminals 120 served by these base stations 110.

Each base station 110 provides communication coverage for a respective geographic area. A base station and/or its coverage area may be referred to as a "cell", depending on the context in which the term is used. To increase capacity, the coverage area of each base station may be partitioned into multiple (e.g., three) sectors 112. Each sector is served by a BTS. For a sectorized cell, the base station for that cell typically includes the BTSs for all sectors of that cell. For simplicity, in the following description, the term "base station" is used generically for both a fixed station that serves a cell and a fixed station that serves a sector. A "serving" base station or "serving" sector is one with which a terminal communicates. The terms "user" and "terminal" are also used interchangeably herein.

The interference control techniques described herein may be used for various wireless communication systems. For example, these techniques may be used for an OFDMA system, a Time Division Multiple Access (TDMA) system, a Frequency Division Multiple Access (FDMA) system, and so on. A TDMA system uses time division multiplexing (TDM), and transmissions for different terminals are orthogonalized by transmitting in different time intervals. An FDMA system uses frequency division multiplexing (FDM), and transmissions for different terminals are orthogonalized by transmitting in different frequency subbands. An OFDMA system utilizes OFDM, which effectively partitions the overall system bandwidth into a number of (N) orthogonal frequency subbands. These subbands are also referred to as tones, subcarriers, bins, frequency channels, and so on. Each subband is associated with a respective sub-carrier that may be modulated with data. An OFDMA system may use any combination of time, frequency, and/or code division multiplexing.

The interference control techniques may also be used for the forward link as well as the reverse link. For clarity, these techniques are described below for the forward link in an FH-OFDMA system. For this FH-OFDMA system, multiple "traffic" channels may be defined whereby (1) each subband is used for only one traffic channel in any given hop period and (2) each traffic channel may be assigned zero, one, or multiple subbands in each hop period.

Figure 2:
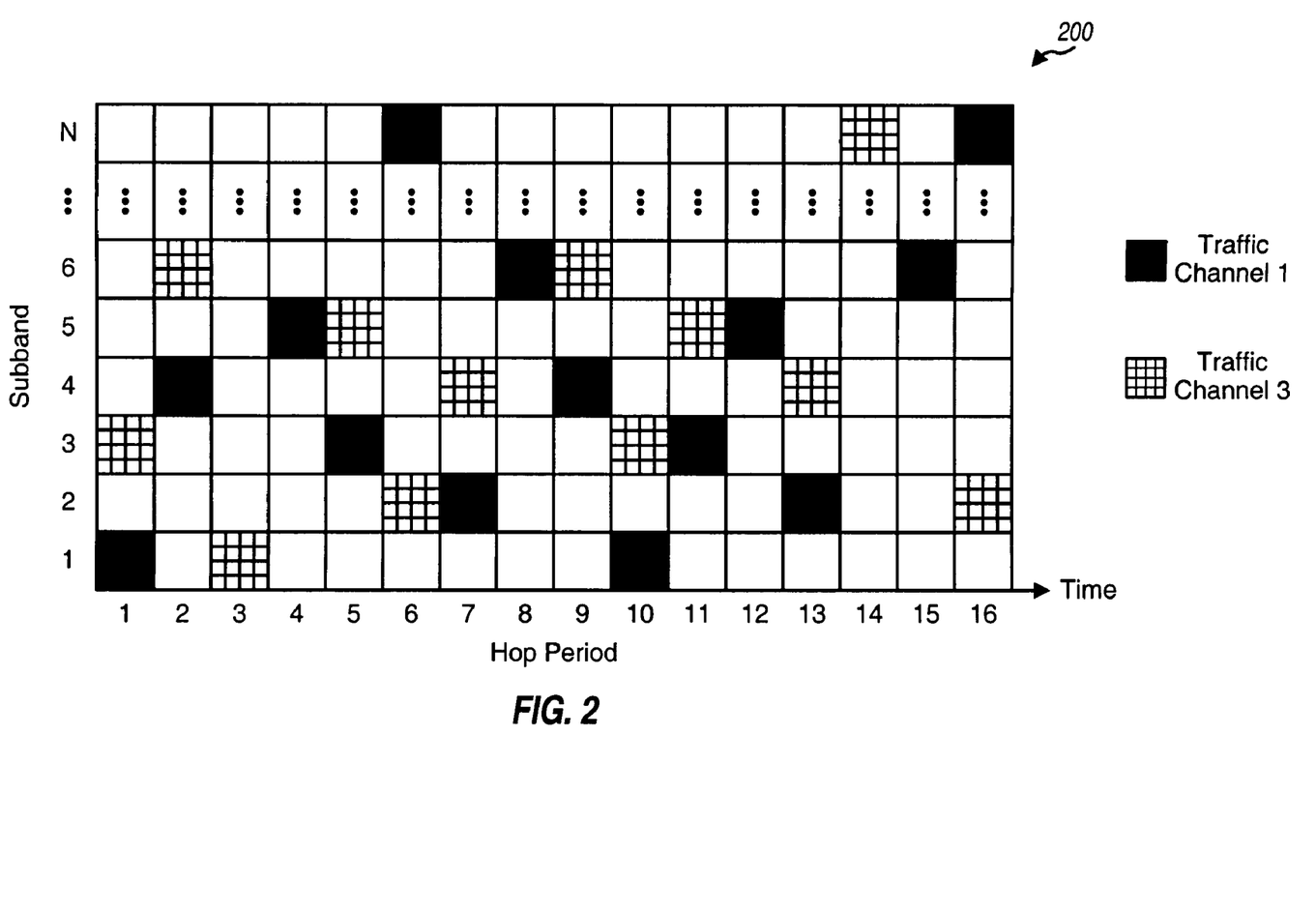
FIG. 2 illustrates frequency hopping on a time-frequency plane.

FIG. 2 illustrates frequency hopping on a time-frequency plane 200 for the FH-OFDMA system. With frequency hopping, each traffic channel is associated with a specific FH sequence that indicates the particular subband(s) to use for that traffic channel in each hop period. The FH sequences for different traffic channels in each sector are orthogonal to one another so that no two traffic channels use the same subband in any given hop period. The FH sequences for each sector are also pseudo-random with respect to the FH sequences for nearby sectors. These properties minimize intra-sector interference and randomize inter-sector interference. Interference between two traffic channels in two sectors occurs whenever these traffic channels use the same subband in the same hop period. However, the inter-sector interference is randomized due to the pseudo-random nature of the FH sequences used for different sectors.

Although frequency hopping can randomize inter-sector interference over a data transmission, the interference may still be high and may significantly degrade performance for some users. For example, users located at the edge of their sectors (e.g., terminals 120a, 120b and 120e in FIG. 1) typically receive their data transmissions at low power levels because they are farther away from their serving base stations. Furthermore, these sector-edge users may also receive higher levels of interference because they are located closer to interfering base stations. The interference may be bursty, and large amounts of interference may occur whenever the FH sequences for users in neighboring sectors collide with the FH sequences for the sector-edge users.

The techniques described herein can control inter-sector interference for target users due to interfering users in other sectors. In general, a target user is one for which reduced inter-sector interference is sought. An interfering user is one deemed to be interfering with a target user. The target and interfering users are in different sectors with the frequency hopping described above. The target and interfering users as well as interfering sectors may be identified as described below. Inter-sector interference may be controlled in various manners.

In a first embodiment for controlling inter-sector interference, the transmit powers for interfering users are selectively blanked or attenuated whenever their transmissions collide with the transmission for a target user. The selective blanking/ attenuation may be performed, for example, as follows. If a sector has difficulty communicating with a particular user, then this sector may inform neighboring sectors of the difficulty and provide the FH sequence or the subband usage for this target user. Each neighboring sector may use the target user's FH sequence to form a blanking pattern for that sector. Each neighboring sector may then blank or reduce the transmit power for each subband in its blanking pattern. In effect, each user in each neighboring sector is deemed to be an interfering user to the target user. However, interfering users may also be identified in other manners, as described below.

Each user in each neighboring sector would receive either no transmission or transmission with reduced power on each subband in the blanking pattern for that sector. If blanking is performed, then each neighboring user would experience randomized puncturing of data symbols that are not transmitted on the subbands in the blanking pattern. The puncturing rate is determined by the rate at which the FH sequence for an interfering user collides with the FH sequence for the target user. The puncturing rate should be relatively low so that neighboring users experience negligible degradation in performance. If attenuation is performed, then each neighboring user would receive lower energy symbols on the subbands in the blanking pattern, due to the use of lower transmit powers for these subbands. However, these received symbols still contain useful information and are helpful for decoding.

For clarity, selective blanking (and not attenuation) of interfering transmissions is described below for a specific example. In this example, each user maintains an "active set" that contains all sectors that are candidates for serving the user. Each user may receive pilots from various sectors, measure the received pilot power for each sector, and add a sector in the active set if the received pilot power for the sector exceeds a predetermined add threshold. For this example, each user communicates with only one sector in the active set at any given time, which is called the serving sector. Each user may (e.g., continually or periodically) measure the pilots from the sectors in the active set and may select one sector to designate as the serving sector based on the pilot measurements. Each user may also (e.g., periodically) search for pilots from other sectors, measure these pilots, and determine whether or not to update/change the sectors in the active set. Each user may provide its active set to its serving sector, for example, at the start of a call and whenever the active set changes. Each sector would then have the active set information for each user in communication with that sector.

Referring back to FIG. 1, eight users a through h for terminals 120a through 120h, respectively, are shown distributed throughout sectors 1 and 2. The active set for each user is shown within parenthesis, with the serving sector being indicated by bold and underlined text and the non-serving sector (if any) by normal text. Sector 1 is the serving sector for users a, b, c and d, and sector 2 is the serving sector for users e, f, g and h.

Figure 3A:
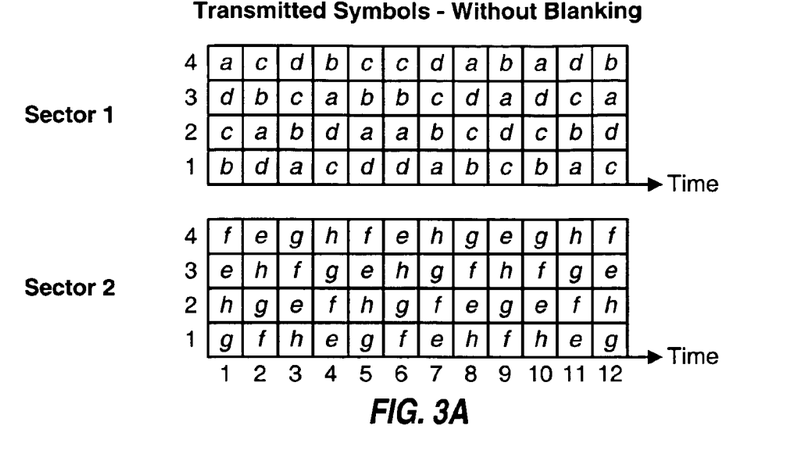
FIGS. 3A through 3C show data transmission without and with selective blanking of interfering transmissions.

FIG. 3A shows data transmissions for sectors 1 and 2 without selective blanking of interfering transmissions. In this example, each sector has four sets of subbands, which are given indices of 1 through 4. Each subband set may include one or multiple subbands. Each square box corresponds to one "transmission span", which is one subband set in one hop period for the FH-OFDMA system. Each sector also has four FH sequences that are assigned to the four users being served by that sector. Each sector transmits data to the four users on the subbands indicated by their assigned FH sequences. As shown in FIG. 3A, without selective blanking, each sector transmits on all four subband sets to four users in each hop period. The transmissions for the four users in each sector are labeled by the italic texts within the square boxes.

Referring back to FIG. 1, sector 1 may have difficulty transmitting to user a and b. In this example, all non-serving sectors in a target user's active set are deemed to be interfering sectors. Since users a and b both have sector 2 as the only non-serving sector in their active sets, sector 1 informs sector 2 of the difficulty in transmitting to users a and b and provides the FH sequences for users a and b. Sector 2 would then blank the transmissions for its four users e through h whenever these transmissions interfere with users a and b. Similarly, sector 2 may have difficulty transmitting to user e. Since user e has sector 1 as the only non-serving sector in its active set, sector 2 informs sector 1 of the difficulty in transmitting to user e and also provides the FH sequence for user e. Sector 1 would then blank the transmissions for its four users a through d whenever these transmissions interfere with user e.

Figure 3B:
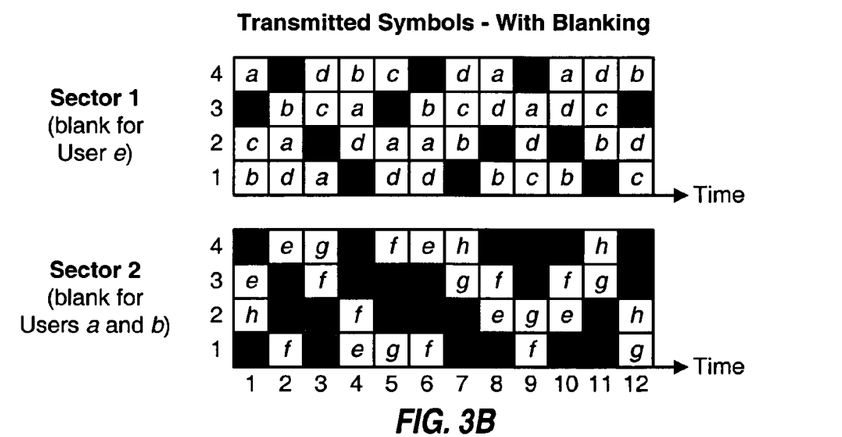

FIG. 3B shows data transmissions for sectors 1 and 2 with selective blanking of interfering transmissions. Sector 1 uses a blanking pattern formed by the FH sequence for user e and blanks the transmissions for its users a through d whenever there is a collision with the blanking pattern. Thus, sector 1 blanks the transmissions on subband set 3 in hop period 1, subband set 4 in hop period 2, subband set 2 in hop period 3, and so on, which are used for user e. The blanked transmissions are shown by the shaded boxes. Because of the selective blanking by sector 1, user e in sector 2 observes no interference from sector 1 and may be able to enjoy better performance.

Sector 2 uses a blanking pattern formed by the FH sequences for users a and b and blanks the transmissions for its users e through h whenever there is a collision with the blanking pattern. Thus, sector 2 blanks the transmissions on subband sets 1 and 4 in hop period 1, subband sets 2 and 3 in hop period 2, subband sets 1 and 2 in hop period 3, and so on, which are used for users a and b. Because of the selective blanking by sector 2, users a and b in sector 1 observe no interference from sector 2 and may also be able to enjoy better performance.

For the first embodiment and as shown in FIG. 3B, multiple sectors transmit simultaneously on the same subband in the same hop period only to users that have disjoint active sets (i.e., different members in their active sets). These users may be assumed to not interfere with one another strongly. Thus, simultaneous transmissions for these users are possible without degrading performance.

Figure 3C:
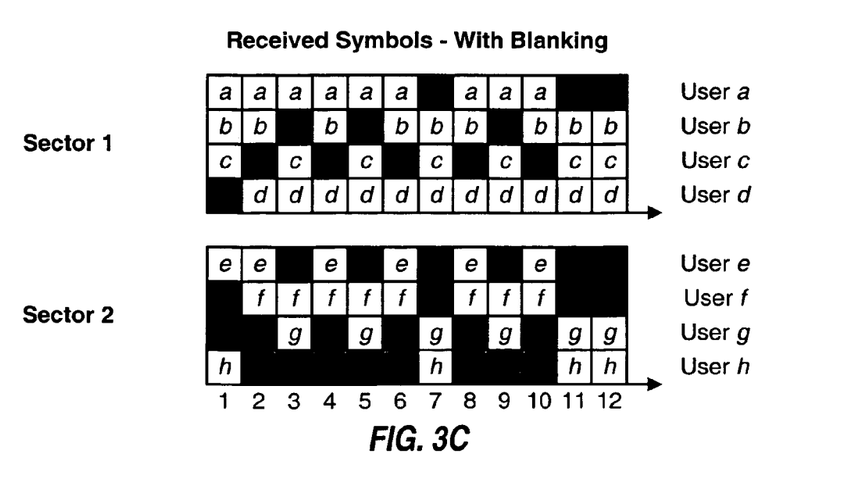

FIG. 3C shows the sequence of received symbols for each user in sectors 1 and 2 with selective blanking. Because of the selective blanking by sector 1 for user e in sector 2, each of users a through d has punctured symbols on subbands that collide with the blanking pattern used by sector 1. The punctured symbols are pseudo-randomly distributed because the FH sequences for users a through d are pseudo-random with respect to the FH sequence for user e, which is used as the blanking pattern for sector 1. Similarly, because of the selective blanking by sector 2 for users a and b in sector 1, each of users e through h has punctured symbols on subbands that collide with the blanking pattern used by sector 2. Again, the punctured symbols for users e through h are pseudo-randomly distributed.

As shown in FIG. 3B, the punctured symbols may contain interference from other sectors. Each user may be provided with the blanking pattern used by its serving sector. Each user may then identify its blanked symbols based on the blanking pattern and may set these blanked symbols (which may contain inter-sector interference) to erasures, which are given no weight in the decoding process.

The puncturing of data symbols due to selective blanking degrades decoding performance. if the puncturing by a given sector is excessive, then each user in that sector may not receive a sufficient number of symbols for reliable decoding even though interference from other sectors has been reduced. The selective attenuation may thus be performed in a manner to balance the advantages of interference reduction with the disadvantages of puncturing so that the best gain in overall performance can be achieved. For example, the puncturing rate for each user may be limited to within a predetermined percentage of the total number of data symbols sent to that user.

For the example described above, each target user has only one interfering sector in its active set. In general, the active set for each user may include any number of sectors, and each target user may have any number of interfering sectors.

The first embodiment described above can reduce inter-sector interference on the forward link without requiring any changes at the terminals. The target and interfering users do not need to be informed of the selective blanking/attenuation being performed. Thus, no over-the-air signaling is needed to support selective blanking/attenuation. The target and interfering users can process (e.g., demodulate and decode) their transmissions in the same manner regardless of whether or not selective blanking/attenuation is performed.

The selective blanking/attenuation may also be readily implemented by the sectors. Each sector may process (e.g., code and modulate) data for its users in the normal manner to obtain data symbols. Each sector may perform selective blanking/attenuation during or after the mapping of the data symbols to subbands. Only a small amount of signaling between sectors is needed to implement selective blanking/attenuation.

For the first embodiment described above and shown in FIGS. 3A through 3C, each sector blanks transmissions on subbands that collide with its blanking pattern. This embodiment results in no transmission by any sector on subbands that are in the blanking patterns for multiple sectors. For example, referring to FIG. 3B, no data symbols are transmitted by either sector 1 or 2 on subband set 2 in hop period 3, on subband set 3 in hop period 5, and so on. Improved performance may be achieved by letting one sector transmit on each of these subbands and, albeit at the expense of more signaling, performing the blanking at the terminals.

In a second embodiment for controlling inter-sector interference, the transmit powers for interfering users are selectively blanked or attenuated as described above for the first embodiment, but one or more sectors are allowed to transmit on subbands that are common to the blanking patterns of multiple sectors. The second embodiment may be performed, for example, as follows. Each sector determines its own blanking pattern based on the FH sequences for all target users in neighboring sectors. A designated sector may be provided with the blanking patterns used by neighboring sectors and may determine an "overlap pattern" based on an intersection of its blanking pattern and the blanking patterns for the neighboring sectors. The designated sector may then be permitted to transmit on the subbands in the overlap pattern. Alternatively, each sector may be provided with the blanking patterns used by neighboring sectors and may determine the overlap pattern based on its blanking pattern and those for the neighboring sectors. Multiple sectors may then be permitted to share transmission on the subbands in the overlap pattern. The sharing may be achieved, e.g., in a predetermined manner. In any case, each user that is affected by transmissions on the subbands in the overlap pattern may receive a puncturing pattern, which may be the blanking pattern for its serving sector. Each affected user may then puncture its received symbols for the subbands in the puncturing pattern.

Figure 4A:
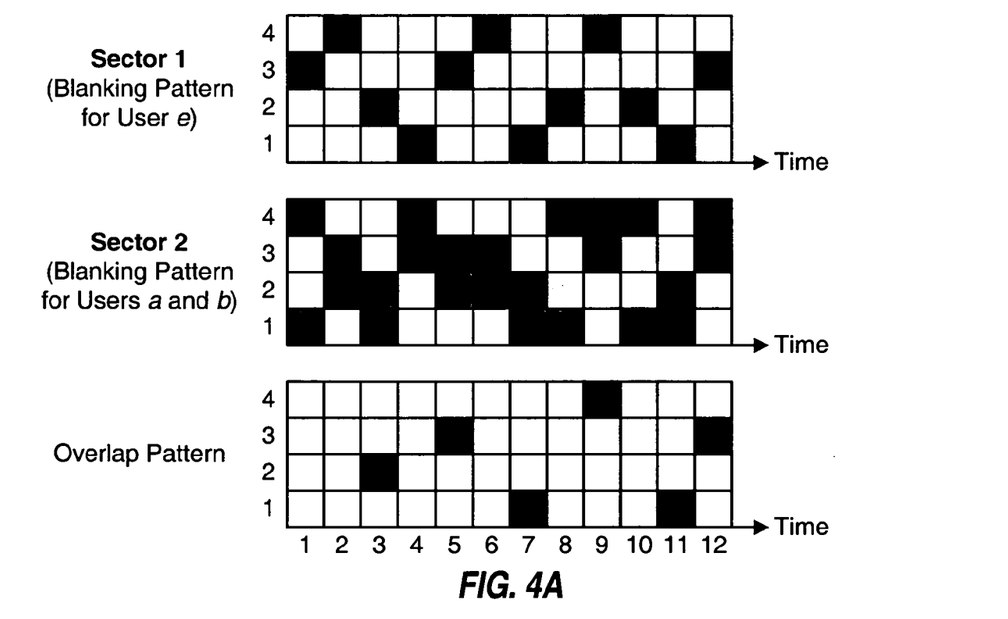
FIGS. 4A through 4C show data transmission with selective blanking of interfering transmissions and on subbands blanked by a neighboring sector.

FIG. 4A shows the blanking patterns for sectors 1 and 2 for the example described above in FIGS. 3A through 3C. FIG. 4A also shows the overlap pattern generated by the intersection of the blanking patterns for sectors 1 and 2. This overlap pattern includes subband set 2 in hop period 3, subband set 3 in hop period 5, and so on. The overlap pattern includes subbands that both sectors 1 and 2 would not have transmitted on for the first embodiment described above. Either sector 1 or 2 may be permitted to transmit on the subbands in the overlap pattern.

Figure 4B:
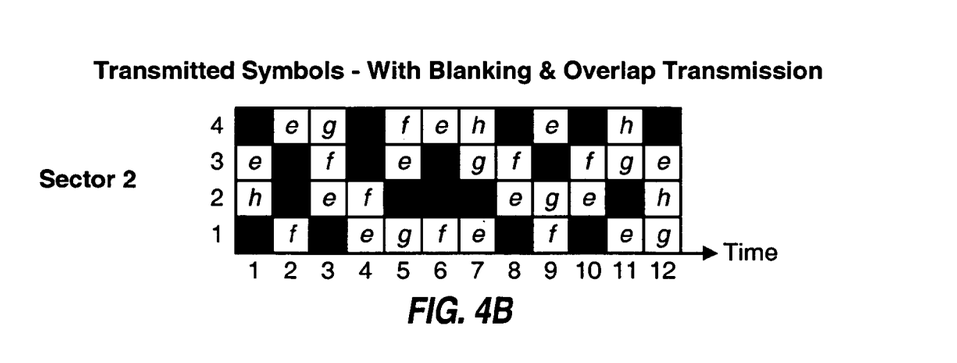

FIG. 4B shows data transmissions for sector 2 with selective blanking for users a and b in sector 1 and with overlap transmission, which is transmission on the subbands in the overlap pattern. The blanking pattern for sector 2 is formed by the FH sequences for users a and b but excludes the subbands in the overlap pattern. Because of the transmissions on the subbands in the overlap pattern, users a and b observe interference on these subbands. However, users a and b may be provided with the overlap pattern used by sector 2. Each of these users may then puncture its received symbols for these subbands. As a result, users a and b would obtain the same received symbols shown in FIG. 3C, albeit with the puncturing being performed at the receivers instead of the transmitter.

Figure 4C:
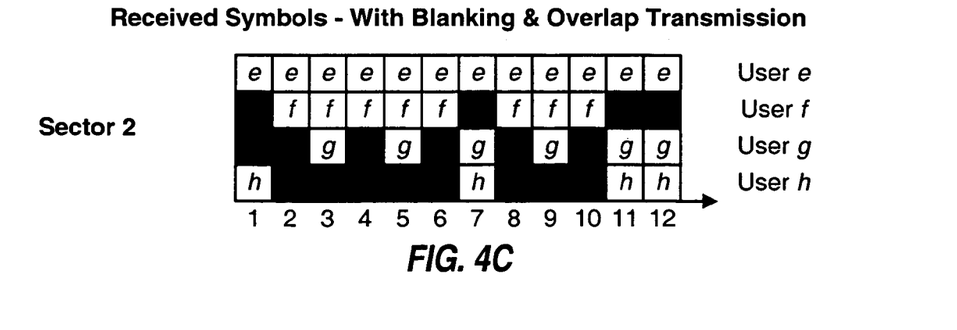

FIG. 4C shows the sequence of received symbols for each user in sector 2 with selective blanking and overlap transmission. Because sector 2 is permitted to transmit on subbands in the overlap pattern, user e in sector 2 is able to obtain all of its received symbols. Consequently, the performance of user e may be improved. This is particularly advantageous since sector 2 may be having difficulty communicating with user e and thus seek to reduce inter-sector interference for user e.

For the example shown in FIGS. 4A through 4C, one sector is allowed to transmit on the subbands in the overlap pattern. Multiple sectors may also share transmission on these subbands. For example, sector 1 may be permitted to transmit on subbands in the overlap pattern for odd-numbered hop periods, and sector 2 may be permitted to transmit on subbands in the overlap pattern for even-numbered hop periods. This results in each of sectors 1 and 2 transmitting on average on half of the subbands in the overlap pattern. The allocation of subbands in the overlap pattern may also be made based on the number of target users in each sector. For example, since sector 1 has two target users a and b whereas sector 2 has only one target user e, sector 1 may be permitted to transmit on two-thirds of the subbands in the overlap pattern, and sector 2 may be permitted to transmit on the remaining one-third of the subbands. This results in each target user for sectors 1 and 2 having on average the same percentage of punctured symbols.

If multiple sectors share transmission on the subbands in the overlap pattern, then an "overlap subpattern" may be formed for each sector and would include all subbands in the overlap pattern that are allocated to that sector. The blanking pattern for each sector may be formed by the FH sequences for target users in neighboring sectors minus the subbands in the overlap subpattern for that sector. Each user in each sector may perform puncturing in accordance with the blanking pattern for that sector.

For simplicity, selective blanking has been described above for the examples shown in FIGS. 3A through 4C. Blanking has the effect of puncturing symbols for interfering users, regardless of whether or not these users have a reasonable probability of actually interfering with target users.

Selective attenuation (and not blanking) may be performed to reduce inter-sector interference for target users while improving performance for interfering users. Different users in a neighboring sector may cause different amounts of interference to a given target user. Furthermore, sufficient reduction in inter-sector interference for the target user may be achieved by just attenuating the transmit powers for interfering users. Selective attenuation may also be performed for certain interfering users and/or in certain situations.

Selective attenuation may be performed in various manners. In one embodiment for performing attenuation, the transmit powers for subbands in the blanking pattern are reduced by a predetermined amount (e.g., 3, 6, or 10 dB). The interfering users would then receive lower energy symbols on these subbands, which may still be useful for decoding. In another embodiment, the transmit powers for subbands in the blanking pattern are limited to a predetermined power level, $P_{cap}$. Users in neighboring sectors that are located closer to their serving base stations may require less transmit powers and may still be able to achieve good performance with reduced or limited transmit powers. For example, if the transmit power for each user is power-controlled to achieve a desired level of performance, then limiting the transmit power for each user to be within the predetermined power level, $P_{cap}$, may not affect strong users who are already transmitting below this power level.

Selective blanking and attenuation may both be performed by a sector for different users in the sector. The sector may use blanking for users more likely to cause large interference to a target user and attenuation for users less likely to cause large interference. For example, blanking may be performed for users having the target user's serving sector in their active set, and attenuation may be performed for users not having this serving sector in their active set. For the example shown in FIG. 1, sector 1 may blank the transmissions for users a and b and attenuate the transmissions for users c and d when these transmissions collide with the blanking pattern for sector 1.

Similarly, sector 2 may blank the transmission for user e and attenuate the transmissions of users f, g and h when these transmissions collide with the blanking pattern for sector 2. This combination of blanking and attenuation may be used for the forward link and may be even more effective for the reverse link.

Selective blanking/attenuation may be performed on transmissions for interfering users for the benefits of target users. A target user may be identified in various manners. For example, a user with multiple sectors in its active set may be deemed as a target user, as described for FIGS. 3A through 3C. As another example, a user with which a sector has difficulty communicating (e.g., a predetermined number of transmissions has failed) may be deemed as a target user. As yet another example, a user measuring high received pilot power for a neighboring sector and/or observing strong interference from the neighboring sector may be deemed as a target user.

Interfering users may also be identified in various manners. For example, all non-serving sectors in the active set of a target user may be deemed as interfering sectors, and all users in these sectors may be deemed as interfering users, as described above for FIGS. 3A through 3C. In effect, a neighboring sector is deemed to be an interfering sector if this sector satisfies the condition(s) used to add sectors to the active set. A sector is typically added to the active set if the received pilot power for that sector, as measured by the target user, exceeds an add threshold. As another example, different condition(s) (e.g., a higher pilot power threshold) may be used to determine whether a neighboring sector is interfering or non-interfering. Again, all users in an interfering sector may be deemed as interfering users. Identifying interfering users in these manners may simplify implementation of selective blanking/attenuation.

Each user in a neighboring sector (or simply, each neighboring user) may also be individually deemed as interfering or non-interfering to the target user based on various factors. These factors may include, for example, the received pilot powers measured by the neighboring user for the serving sector of the target user, the transmit power level for the neighboring user, and so on. If a neighboring user is located far away from the target user's serving sector and/or if the transmit power used for the neighboring user is low, then the neighboring user may not be causing too much interference to the target user and may be omitted from selective blanking/attenuation.

Figure 5A:
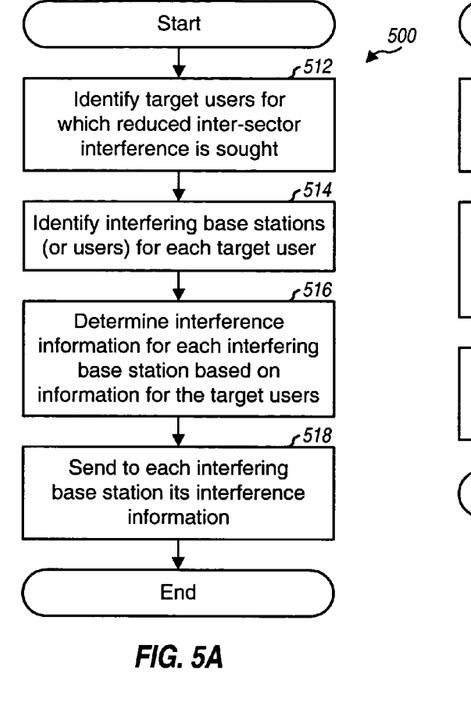
FIG. 5A shows a process for determining subbands to reduce interference.

FIG. 5A shows a flow diagram of a process 500 for determining subbands on which to reduce inter-sector interference. Process 500 may be performed by each base station in the role of a serving base station. Initially, users being served by the base station and for which reduced inter-sector interference is sought (i.e., target users) are identified (block 512). The target users may be users with multiple sectors in their active set or may be identified in some other manners, as described above. Interfering base stations or interfering users for each target user are then identified (block 514). The interfering base stations for each target user may be the non-serving sectors in the active set of the target user or may be identified in some other manners, as also described above. Interference information for each interfering base station is then determined based on information (e.g., the active sets and the FH sequences) for the target users (block 516). The interference information for each interfering base station indicates the specific transmission spans (or the specific subbands and hop periods) for which reduced interference from that base station is sought. The interference information for each interfering base station may comprise, for example, the FH sequences for all target users having this base station as a non-serving sector in their active sets. The interference information is typically different for different interfering base stations. The interference information for each interfering base station is then sent to that base station (block 518).

Figure 5B:
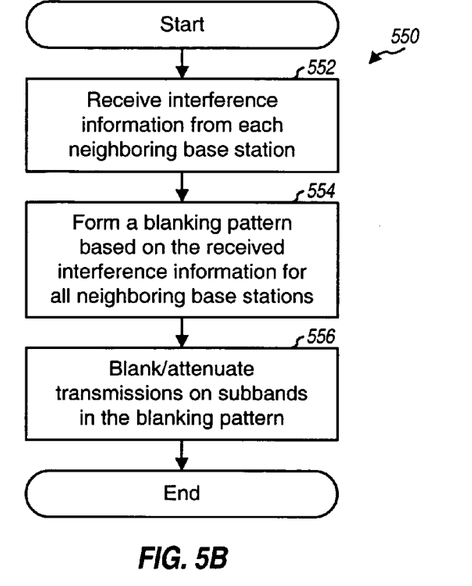
FIG. 5B shows a process for performing selective blanking/attenuation.

FIG. 5B shows a flow diagram of a process 550 for performing selective blanking/attenuation to control inter-sector interference. Process 550 may be performed by each base station in the role of an interfering base station. Initially, interference information is received from each neighboring base station (block 552). A blanking pattern is then formed based on the interference information received from all neighboring base stations (block 554). The blanking pattern may simply include all subbands for all FH sequences for target users in neighboring sectors. The blanking pattern may also exclude subbands that are in an overlap pattern formed as described above. Thereafter, transmissions on subbands in the blanking pattern are blanked/attenuated (block 556). For example, blanking may be performed for all transmissions that collide with the blanking pattern. As another example, blanking may be performed for the transmissions of some users (e.g., those with neighboring sectors in their active set) and attenuation may be performed for other users (e.g., those with no neighboring sectors in their active set).

Figure 6:
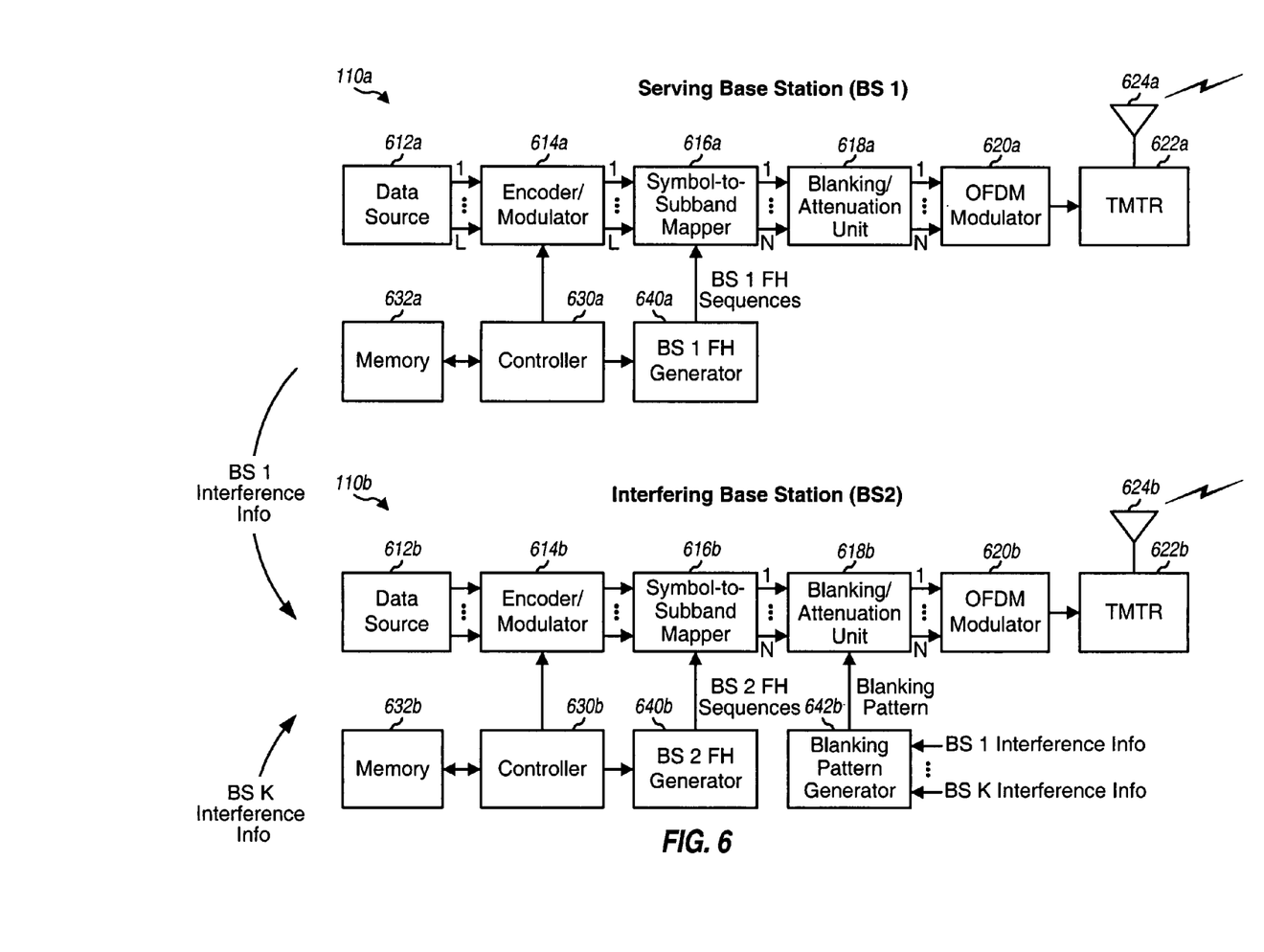
FIG. 6 shows a serving base station and an interfering base station.

FIG. 6 shows a block diagram of an embodiment of serving base station 110a and interfering base station 110b for terminals in sector 1. For simplicity, only the transmitter portion of base stations 110a and 110b is shown in FIG. 6.

Within base station 110a, an encoder/modulator 614a receives traffic/packet data from a data source 612a for L users being served by base station 110a (where $L \geq 1$) and control/overhead data from a controller 630a. Encoder/modulator 614a processes (e.g., formats, encodes, interleaves, and modulates) the traffic/packet data for each user based on a coding and modulation scheme selected for that user and provides data symbols, which are modulation symbols for data. Each modulation symbol is a complex value for a specific point in a signal constellation corresponding to the modulation scheme used for that modulation symbol.

A symbol-to-subband mapping unit 616a receives the data symbols for all L users and provides these data symbols onto the proper subbands determined by the FH sequences assigned to these users, which are generated by an FH generator 640a. Mapping unit 616a also provides pilot symbols on subbands used for pilot transmission and a signal value of zero for each subband not used for pilot or data transmission. For each OFDM symbol period, mapping unit 616a provides N transmit symbols for the N total subbands, where each transmit symbol may be a data symbol, a pilot symbol, or a zero-signal value. A blanking/attenuation unit 618a receives the transmit symbols from mapping unit 616a and performs selective blanking/attenuation for base station 110a.

An OFDM modulator 620a receives N transmit symbols (one or more which may have been blanked/attenuated) for each OFDM symbol period and generates a corresponding OFDM symbol. OFDM modulator 620a typically includes an inverse fast Fourier transform (IFFT) unit and a cyclic prefix generator. For each OFDM symbol period, the IFFT unit transforms the N transmit symbols to the time domain using an N-point inverse FFT to obtain a "transformed" symbol that contains N time-domain chips. Each chip is a complex value to be transmitted in one chip period. The cyclic prefix generator then repeats a portion of each transformed symbol to form an OFDM symbol that contains N+C chips, where C is the number of chips being repeated. The repeated portion is often called a cyclic prefix and is used to combat inter-symbol interference (ISI) caused by frequency selective fading. An OFDM symbol period corresponds to the duration of one OFDM symbol, which is N+C chip periods. OFDM modulator 620a provides a stream of OFDM symbols. A transmitter unit (TMTR) 622a receives and processes (e.g., converts to analog, filters, amplifies, and frequency upconverts) the OFDM symbol stream to generate a modulated signal. The modulated signal is transmitted from an antenna 624a to the terminals in sector 1.

Base station 110b similarly processes traffic and control data for users being served by base station 110b. However, a symbol-to-subband mapping unit 616b provides data symbols for the users in sector 2 onto the proper subbands determined by the FH sequences assigned to these users and generated by an FH generator 640b.

Controllers 630a and 630b direct the operation at base stations 110a and 110b, respectively. Controllers 630a and 630b may each implement processes 500 and 550 to reduce interference generated by their base station on the forward link. Memory units 632a and 632b provide storage for program codes and data used by controllers 630a and 630b, respectively.

For selective blanking/attenuation, base station 110a determines interference information indicating the specific subbands for which reduced inter-sector interference from base station 110b is sought. This interference information is sent to base station 110b. Base station 110b may also receive interference information from other base stations. Within base station 110b, a blanking pattern generator 642b generates a blanking pattern for base station 110b based on the received interference information from all neighboring base stations. Generator 642b may generate FH sequences for each target user in each neighboring sector based on the received interference information and combine the FH sequences for all target users in all neighboring sectors to obtain the blanking pattern for base station 110b. A blanking/attenuation unit 618b receives the transmit symbols from mapping unit 616b and performs selective blanking/attenuation based on the blanking pattern provided by generator 642b. Unit 618b may blank/attenuate transmit symbols that are mapped to, and collide with, the subbands in the blanking pattern.

Figure 7:
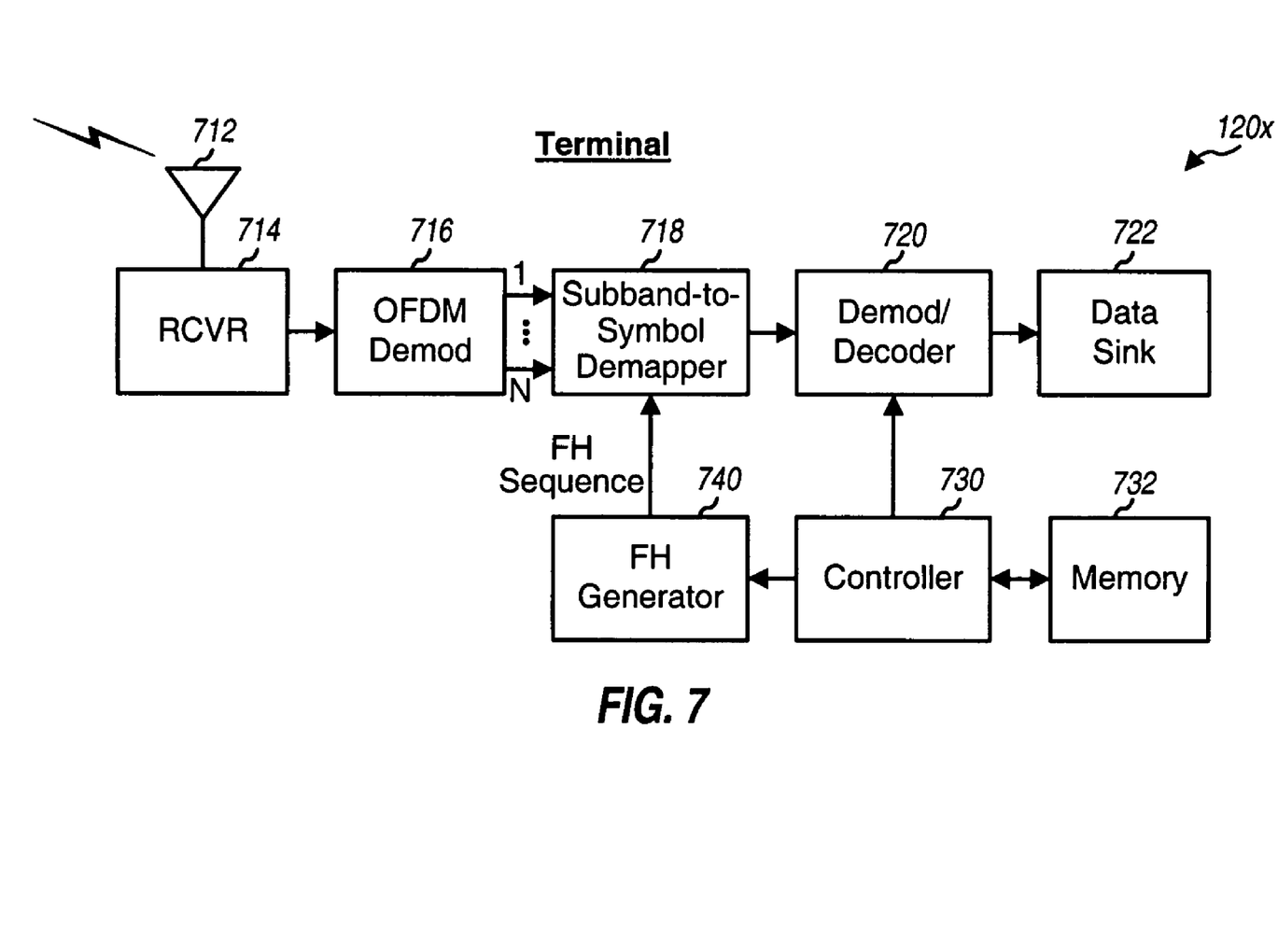
FIG. 7 shows a wireless terminal.

FIG. 7 shows a block diagram of an embodiment of a terminal 120x, which is one of the terminals in system 100. For simplicity, only the receiver portion of terminal 120x is shown in FIG. 7. The modulated signals transmitted by the base stations are received by an antenna 712, and the received signal is provided to and processed by a receiver unit (RCVR) 714 to obtain samples. The set of samples for one OFDM symbol period represents one received OFDM symbol. An OFDM demodulator (demod) 716 processes the samples and provides received symbols, which are noisy estimates of the transmit symbols sent by the base stations. OFDM demodulator 716 typically includes a cyclic prefix removal unit and an FFT unit. The cyclic prefix removal unit removes the cyclic prefix in each received OFDM symbol to obtain a received transformed symbol. The FFT unit transforms each received transformed symbol to the frequency domain with an N-point FFT to obtain N received symbols for the N subbands. A subband-to-symbol demapping unit 718 obtains the N received symbols for each OFDM symbol period and provides received symbols for the subbands assigned to terminal 120x. These subbands are determined by the FH sequence assigned to terminal 120x, which is generated by an FH generator 740. A demodulator/decoder 720 may receive a puncturing pattern and may puncture received symbols for the subbands in the serving base station's blanking pattern. In any case, demodulator/decoder 720 processes (e.g., demodulates, deinterleaves, and decodes) the received symbols for terminal 120x and provides decoded data to a data sink 722 for storage.

A controller 730 directs the operation at terminal 120x. A memory unit 732 provides storage for program codes and data used by controller 730. Controller 730 may implement process 550 to reduce interference generated by terminal 120x on the reverse link.

For clarity, interference control has been specifically described for the forward link. These techniques may also be used to control inter-sector interference on the reverse link. The serving sector for each user may determine whether that user is causing excessive interference on the reverse link. For each user deemed to be causing excessive interference, the serving sector may determine the subbands for which interference should be reduced and provide this interference information to the user. Each interfering user would receive interference information from its serving sector and perform blanking/attenuation of its transmissions on the subbands indicated by the interference information.

For example, referring to FIG. 1, users a and b in sector 1 have multiple sectors in their active sets and may be deemed to cause excessive interference to user e, which has sector 1 as a non-serving sector in its active set. Users a and b may be provided with the FH sequence for user e and may blank/attenuate transmissions on subbands that collide with the FH sequence for user e. Similarly, user e may be deemed to cause excessive interference to users a and b in sector 1, both of which have sector 2 as a non-serving sector in their active sets. User e may be provided with the FH sequences for users a and b and may blank/attenuate transmissions on subbands that collide with the FH sequences for users a and b.

The techniques described herein may be used for OFDM-based systems as well as FDMA and TDMA systems. The selective blanking/attenuation may be performed on transmission spans, where a transmission span may cover time and/or frequency dimensions. For an FDMA system, a transmission span may correspond to one or more frequency subbands in a given time period, and transmissions on frequency subbands with excessive interference may be selectively blanked/attenuated. For a TDMA system, a transmission span may correspond to a given time interval, and transmissions on time intervals with excessive interference may be selectively blanked/attenuated. For an OFDM-based (e.g., OFDMA) system, a transmission span may correspond to a set of one or more subbands in one or more OFDM symbol periods.

The interference control techniques described herein may be implemented by various means. For example, these techniques may be implemented in hardware, software, or a combination thereof. For a hardware implementation, the processing units used to perform interference control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the interference control techniques may be implemented with modules (e.g., procedures, functions, and so on) that perform the functions described herein. The software codes may be stored in a memory unit (e.g., memory unit 632 in FIG. 6 or memory unit 732 in FIG. 7) and executed by a processor (e.g., controller 630 in FIG. 6 or controller 730 in FIG. 7). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of controlling interference caused by a transmitting entity in a wireless communication system, comprising:
  receiving, at the transmitting entity from at least one base station other than the transmitting entity, at least one frequency hopping (FH) sequence assigned to at least one terminal for which reduced interference is sought;
  determining a blanking pattern indicative of transmission spans for which the reduced interference from the transmitting entity is sought based on the received FH sequence; and
  turning off or reducing transmit power for transmissions sent on the transmission spans in the blanking pattern.

2. The method of claim 1, wherein the wireless communication system utilizes orthogonal frequency division multiplexing (OFDM), and wherein each transmission span in the system corresponds to a specific set of one or more subbands in a specific time interval.

3. The method of claim 2, wherein the blanking pattern includes different sets of subbands in different time intervals.

4. The method of claim 1, wherein the blanking pattern includes a subset of all transmission spans usable for data transmission in the system.

5. The method of claim 1, wherein the transmitting entity is a current base station having at least one neighboring base station.

6. The method of claim 5, wherein the blanking pattern includes transmission spans assigned to the at least one terminal in communication with the at least one neighboring base station and for which the current base station is deemed to be an interfering base station.

7. The method of claim 6, wherein the current base station is deemed to be an interfering base station to a terminal in communication with a neighboring base station if received pilot power for the current base station, as measured at the terminal, exceeds a predetermined threshold.

8. The method of claim 6, wherein each terminal in communication with a neighboring base station maintains an active set of one or more base stations with which the terminal may communicate, and wherein the current base station is deemed to be an interfering base station if the current base station appears in the active set for the terminal.

9. The method of claim 5, wherein the blanking pattern excludes transmission spans with blanked or reduced transmission by the at least one neighboring base station.

10. The method of claim 5, further comprising:
  identifying terminals in communication with the current base station and for which reduced interference is sought;
  identifying neighboring base stations causing interference to each identified terminal; and
  determining, for each neighboring base station, transmission spans on which reduced interference from the neighboring base station is sought for the identified terminals.

11. The method of claim 10, wherein a neighboring base station is deemed to be an interfering base station to a terminal in communication with the current base station if received pilot power for the neighboring base station, as measured at the terminal, exceeds a predetermined threshold.

12. The method of claim 10, wherein each terminal in communication with the current base station maintains an active set of one or more base stations with which the terminal may communicate, and wherein a neighboring base station is deemed to be an interfering base station if the neighboring base station appears in the active set for the terminal.

13. The method of claim 1, wherein the transmitting entity is a terminal.

14. The method of claim 13, wherein the FH sequence is received from a base station with which the terminal is in communication.

15. The method of claim 1, wherein the transmit power for transmissions sent on the transmission spans in the blanking pattern is reduced by a predetermined amount.

16. The method of claim 1, wherein the transmit power for transmissions sent on the transmission spans in the blanking pattern is limited to be within a predetermined power level.

17. The method of claim 1, wherein the transmit power is turned off when deemed more likely to cause high interference and reduced when deemed less likely to cause high interference.

18. An apparatus operable to control interference in a wireless communication system, comprising:
  a controller operative to receive, at a transmitting entity from at least one base station other than the transmitting entity, at least one frequency hopping (FH) sequence assigned to at least one terminal for which reduced interference is sought, and to determine a blanking pattern indicative of transmission spans for which the reduced interference from the transmitting entity is sought based on the received FH sequence; and
  a unit operative to turn off or reduce transmit power for transmissions sent on the transmission spans in the blanking pattern.

19. The apparatus of claim 18, wherein the transmitting entity is a current base station having at least one neighboring base station.

20. The apparatus of claim 19, wherein the blanking pattern includes transmission spans assigned to the at least one terminal in communication with the at least one neighboring base station and for which the current base station is deemed to be an interfering base station.

21. The apparatus of claim 19, wherein the controller is further operative to identify terminals in communication with the current base station and for which reduced interference is sought,
  identify neighboring base stations causing interference to each identified terminal, and
  determine, for each neighboring base station, transmission spans on which reduced interference from the neighboring base station is sought for the identified terminals.

22. The apparatus of claim 18, wherein the wireless communication system is an orthogonal frequency division multiple access (OFDMA) system.

23. An apparatus operable to control interference in a wireless communication system, comprising:
  means for receiving, at a transmitting entity from at least one base station other than the transmitting entity, at least one frequency hopping (FH) sequence assigned to at least one terminal for which reduced interference is sought, and to determine a blanking pattern indicative of transmission spans for which the reduced interference from the transmitting entity is sought based on the received FH sequence; and means for turning off or reducing transmit power for transmissions sent on the transmission spans in the blanking pattern.

24. The apparatus of claim 23, wherein the transmitting entity is a current base station having at least one neighboring base station.

25. The apparatus of claim 24, wherein the blanking pattern includes transmission spans assigned to the at least one terminal in communication with the at least one neighboring base station and for which the current base station is deemed to be an interfering base station.

26. The apparatus of claim 24, further comprising:
means for identifying terminals in communication with the current base station and for which reduced interference is sought;
means for identifying neighboring base stations causing interference to each identified terminal; and
means for determining, for each neighboring base station, transmission spans on which reduced interference from the neighboring base station is sought for the identified terminals.

27. A method comprising:
obtaining received symbols for transmission spans assigned to a terminal;
receiving at a base station, from at least one neighboring base station, at least one frequency hopping (FH) sequence assigned to at least one terminal for which reduced interference is sought, and determining a blanking pattern that indicates transmission spans for which the reduced interference from the base station is sought based on the received FH sequence, wherein a subset of the transmission spans assigned to the terminal is included in the received blanking pattern, and wherein transmit power for the base station is turned off or reduced for symbols sent on the transmission spans in the blanking pattern; and
processing the received symbols to obtain decoded data for the terminal.

28. The method of claim 27, wherein the wireless communication system utilizes orthogonal frequency division multiplexing (OFDM), and wherein each transmission span in the system corresponds to a specific set of one or more subbands in a specific time interval.

29. A method comprising:
obtaining received symbols for transmission spans assigned to a terminal of a wireless communication system at a base station, wherein the wireless communication system utilizes orthogonal frequency division multiplexing, and wherein each transmission span in the wireless communication system corresponds to a specific set of one or more subbands in a specific time interval;
receiving at the base station, from at least one neighboring base station, a blanking pattern that indicates transmission spans for which reduced interference from the base station is sought, wherein a subset of the transmission spans assigned to the terminal is included in the received blanking pattern, and wherein transmit power for the base station is turned off or reduced for symbols sent on the transmission spans in the blanking pattern;

setting the received symbols for transmission spans in the blanking pattern and assigned to the terminal to erasures at the base station; and
processing the received symbols to obtain decoded data for the terminal at the base station.

30. An apparatus operable to receive a data transmission sent by a base station to a terminal in a wireless communication system, comprising:
a demapping unit operative to obtain received symbols for transmission spans assigned to the terminal, operative to receive at the base station, from at least one neighboring base station, at least one frequency hopping (FH) sequence assigned to at least one terminal for which reduced interference is sought, and operative to determine a blanking pattern that indicates transmission spans for which the reduced interference from the base station is sought based on the received FH sequence, wherein a subset of the transmission spans assigned to the terminal is included in the blanking pattern, and wherein transmit power for the base station is turned off or reduced for symbols sent on the transmission spans in the blanking pattern; and
a decoder operative to process the received symbols to obtain decoded data for the terminal.

31. An apparatus comprising:
means for obtaining received symbols for transmission spans assigned to a terminal at a base station;
means for receiving at the base station, from at least one neighboring base station, at least one frequency hopping (FH) sequence assigned to at least one terminal for which reduced interference is sought, and determining a blanking pattern that indicates transmission spans for which the reduced interference from the base station is sought based on the received FH sequence, wherein a subset of the transmission spans assigned to the terminal is included in the blanking pattern, and wherein transmit power for the base station is turned off or reduced for symbols sent on the transmission spans in the blanking pattern; and
means for processing the received symbols to obtain decoded data for the terminal.

32. A method comprising:
obtaining received symbols for transmission spans assigned to a terminal at a base station of a wireless communication system;
receiving at the base station, from at least one neighboring base station, at least one frequency hopping (FH) sequence assigned to at least one terminal for which reduced interference is sought, and determining a blanking pattern that indicates transmission spans for which the reduced interference from the terminal is sought based on the received FH sequence, wherein a subset of the transmission spans assigned to the terminal is included in the blanking pattern, and wherein transmit power for the terminal is turned off or reduced for symbols sent on the transmission spans in the blanking pattern; and
processing the received symbols to obtain decoded data for the terminal.

33. The method of claim 32, wherein the wireless communication system utilizes orthogonal frequency division multiplexing (OFDM), and wherein each transmission span in the system corresponds to a specific set of one or more subbands in a specific time interval.

34. A method of receiving a data transmission sent by a terminal to a base station in a wireless communication system utilizes orthogonal frequency division multiplexing (OFDM), comprising:

obtaining received symbols for transmission spans assigned to the terminal, wherein each transmission span in the system corresponds to a specific set of one or more subbands in a specific time interval;

receiving at the base station, from at least one neighboring base station, a blanking pattern that indicates transmission spans for which reduced interference from the terminal is sought, wherein a subset of the transmission spans assigned to the terminal is included in the blanking pattern, and wherein transmit power for the terminal is turned off or reduced for symbols sent on the transmission spans in the blanking pattern;

setting the received symbols for the transmission spans in the blanking pattern to erasures; and processing the received symbols to obtain decoded data for the terminal.

35. A non-transient machine-readable medium comprising code, which, when executed by a machine, cause the machine to perform operations, for controlling interference caused by a transmitting entity in a wireless communication system, the code comprising instructions to:

receive at the transmitting entity from at least one base station other than the transmitting entity, at least one frequency hopping (FH) sequence assigned to at least one terminal for which reduced interference is sought;

determine a blanking pattern indicative of transmission spans for which the reduced interference from the transmitting entity is sought based on the received FH sequence;

and turn off or reduce transmit power for transmissions sent on the transmission spans in the blanking pattern.

\* \* \* \* \*